(12) United States Patent
Buzdum

(10) Patent No.: US 11,441,715 B1
(45) Date of Patent: Sep. 13, 2022

(54) RATCHET CLAMP WITH AUTOMATIC FAIL SAFE

(71) Applicant: Mirko Buzdum, Watertown, WI (US)

(72) Inventor: Mirko Buzdum, Watertown, WI (US)

( * ) Notice: Subject to any disclaimer, the term of this patent is extended or adjusted under 35 U.S.C. 154(b) by 178 days.

(21) Appl. No.: 16/055,354

(22) Filed: Aug. 6, 2018

(51) Int. Cl.
*F16L 37/20* (2006.01)
*F16L 23/06* (2006.01)
*F16L 37/12* (2006.01)

(52) U.S. Cl.
CPC ............... *F16L 37/20* (2013.01); *F16L 23/06* (2013.01); *F16L 37/1225* (2013.01)

(58) Field of Classification Search
CPC ....... F16L 37/20; F16L 23/06; F16L 37/1225; Y10T 24/2183; Y10T 24/1412; Y10T 24/1482; A43C 11/146
See application file for complete search history.

(56) References Cited

U.S. PATENT DOCUMENTS

| | | | | |
|---|---|---|---|---|
| 3,491,411 A * | 1/1970 | Basson | ................ | F16L 33/035 24/20 TT |
| 4,008,937 A | 2/1977 | Filippi | | |
| 5,416,952 A | 5/1995 | Dodge | | |
| 6,105,212 A * | 8/2000 | Wright | .................... | F16L 33/12 24/20 TT |
| 6,898,825 B1 * | 5/2005 | Charest | ................ | F16L 33/035 24/16 PB |
| 9,512,944 B1 * | 12/2016 | Buzdum | ................. | F16L 23/06 |
| 2007/0089945 A1 * | 4/2007 | Martignago | .......... | F16D 63/006 188/79.54 |
| 2011/0101687 A1 | 5/2011 | Heelan, Jr. et al. | | |
| 2011/0290840 A1 * | 12/2011 | Huang | ...................... | B60R 9/10 224/539 |
| 2014/0007464 A1 * | 1/2014 | Bird | ..................... | A43C 11/146 36/131 |
| 2014/0157626 A1 * | 6/2014 | Briggs | ................. | A44B 11/065 36/83 |

FOREIGN PATENT DOCUMENTS

| | | | | |
|---|---|---|---|---|
| CA | 2759930 A1 * | 7/2011 | ........... | A43C 11/146 |
| EP | 0242531 A1 * | 10/1987 | ......... | A43C 11/1433 |

* cited by examiner

Primary Examiner — James M Hewitt, II
(74) Attorney, Agent, or Firm — Donald J. Ersler

(57) ABSTRACT

A ratchet clamp with automatic fail safe preferably includes a first clamp half, a second clamp half, a ratchet arm and a locking ratchet device. The first and second clamp halves include a substantially semi-circular shape and a V-shaped cross section. One end of the first clamp half is pivotal secured to one end of the second clamp half. The ratchet arm includes a plurality of teeth. The locking ratchet device includes a ratchet lever and a lock pawl. The ratchet arm extends from an opposing end of the first clamp half. The locking ratchet device extends from an opposing end of the second clamp half. The ratchet arm is inserted into the locking ratchet device. The ratchet lever is lifted to tighten the clamp around flanges of two pipes. The lock pawl is used to lock a position of the ratchet arm relative to the locking ratchet device.

19 Claims, 6 Drawing Sheets

RATCHET CLAMP WITH AUTOMATIC FAIL SAFE

BACKGROUND OF THE INVENTION

1. Field of the Invention

The present invention relates generally to joining two adjacent pipes and more specifically to a ratchet clamp with automatic fail safe, which utilizes a locking ratchet device to draw two clamp halves together.

2. Discussion of the Prior Art

U.S. Pat. No. 4,008,937 to Filippi discloses a coupling assembly. U.S. Pat. No. 5,416,952 to Dodge discloses a ratchet-type buckle. Patent publication no. 2011/0101687 to Heelan Jr. et al. discloses a coupling.

Accordingly, there is a clearly felt need in the art for a ratchet clamp with automatic fail safe, which utilizes a locking ratchet device to draw two clamp halves together.

SUMMARY OF THE INVENTION

The present invention provides a ratchet clamp with automatic fail safe, which utilizes a locking ratchet device to draw two clamp halves together. The ratchet clamp with automatic fail safe (ratchet clamp) preferably includes a first clamp half, a second clamp half, a ratchet arm and a locking ratchet device. The first and second clamp halves include a substantially semi-circular shape and a V-shaped cross section. The V-shaped cross section will retain a flange style pipe connector or a lock ring style pipe connector. A pivot flange is formed on one end of the first clamp half and the ratchet arm is secured to an opposing end of the first clamp half with welding, fasteners or any other suitable method. The ratchet arm may be made as an integral portion of the first clamp half. A pivot yoke is formed on one end of the second clamp half to receive the pivot flange of the first clamp half. The pivot yoke is pivotally secured to the pivot flange with a pin, rivets or any other suitable fastener. The locking ratchet device is attached to an opposing end of the second clamp half with welding, fasteners or any other suitable method.

The ratchet arm includes a base member and a tooth member. The tooth member preferably extends from the base member at an obtuse angle. The tooth member includes a plurality of ratchet teeth formed on a top surface thereof. The locking ratchet device includes a base bracket, a ratchet lever and a lock pawl. The base bracket includes a base plate, a first side plate and a second side plate. The first side plate extends upward from a first end of the base plate and the second side plate extends upward from a second end of the base plate. A pair of angled slots are formed through the first and second side plates. A spring anti-rotation hole is preferably formed through the first and second side plates, adjacent each angled slot.

A ratchet lever spring includes a first lever torsion spring, a second lever torsion spring and a lever connecting member. One end of the first lever torsion spring extends from a first end of the lever connecting member and one end of the second lever torsion spring extends from a second end of the lever connecting member. The opposing ends of the first and second torsion springs extend at an obtuse angle from the lever connecting member. Each opposing end of the first and second lever torsion springs are turned outward to be received by the spring anti-rotation holes.

A pawl lock spring includes a first lock torsion spring, a second lock torsion spring and a lock connecting member. One end of the first lock torsion spring extends from a first end of the lock connecting member and one end of the second lock torsion spring extends from a second end of the lock connecting member. The opposing ends of the first and second lock torsion springs extend in an opposing direction from the lock connecting member. Each opposing end of the first and second torsion springs are turned outward to be received by the spring anti-rotation holes.

The ratchet lever preferably includes a base member, a lever member and a drive member. A clearance slot is formed through the base member. The lever member extends from one end of the base member, preferably at an obtuse angle. The drive member extends from an opposing end of the base member. The drive member includes a plurality of ratchet teeth formed on an outer radius thereof. A lever pin hole is formed through the drive member concentric with an axis of the outer radius. A pair of opposing counter bores are formed in the drive member concentric with the axis of the outer radius to receive the ratchet lever spring. A lever pin is inserted through the angled slots and the lever pin hole to pivotally retain the ratchet lever in the base bracket. The ratchet lever spring biases the ratchet lever upward in the angled slot. When ratchet lever is pushed downward from a perpendicular orientation, the plurality of ratchet teeth engage the ratchet teeth in the ratchet arm.

The lock pawl includes a downward facing ratchet tooth, a lock pivot hole and a top projection. The lock pivot hole is formed through an end of the lock pawl, parallel to the ratchet tooth. A width of the top projection is less than a width of the lock pawl. A width of the top projection is sized to be received by the clearance slot. A lock pin is inserted through the angled slots and the lock pin hole to pivotally retain the ratchet lever in the base bracket. The pawl lock spring biases the lock pawl downward, such that the ratchet tooth engages at least one of the teeth in the ratchet arm.

In use, two pipes with connectors are attached adjacent to each other by placing the first and second clamp halves over the two pipe connectors. The ratchet arm is pushed into the locking ratchet device. The ratchet lever is then lifted-up to pull the first and second clamp halves toward each other. The ratchet clamp is removed from the two pipes by lifting an end of the lock pawl away from the two pipes.

Accordingly, it is an object of the present invention to provide a ratchet clamp with automatic fail safe, which utilizes a locking ratchet device to draw two clamp halves together.

These and additional objects, advantages, features and benefits of the present invention will become apparent from the following specification.

DETAILED DESCRIPTION OF THE PREFERRED EMBODIMENTS

Figure 1:
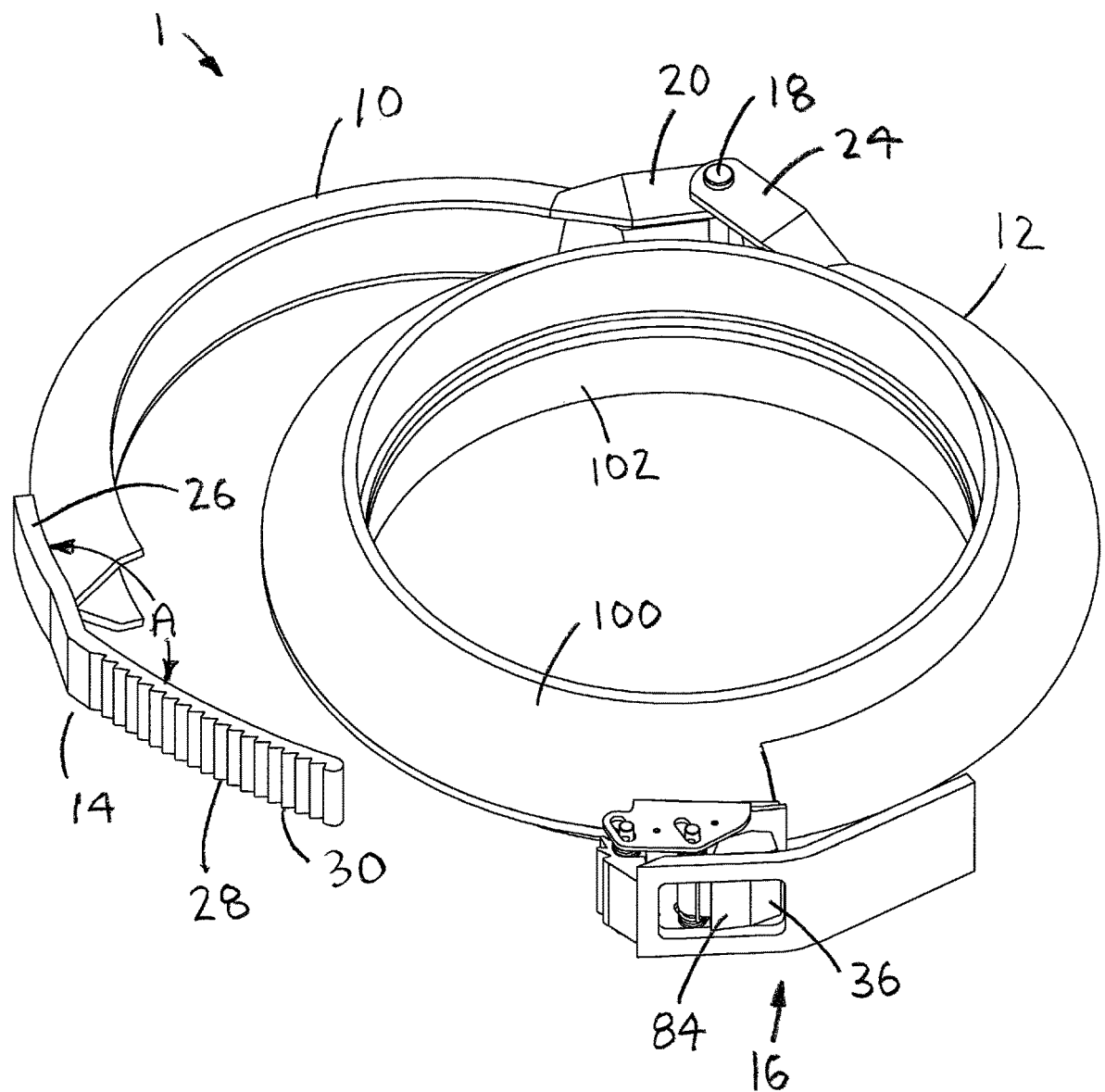
FIG. 1 is a perspective view of a ratchet clamp in an open orientation with a pair of flange style connectors of a pair of pipes retained in a second clamp half in accordance with the present invention.
Figure 2:
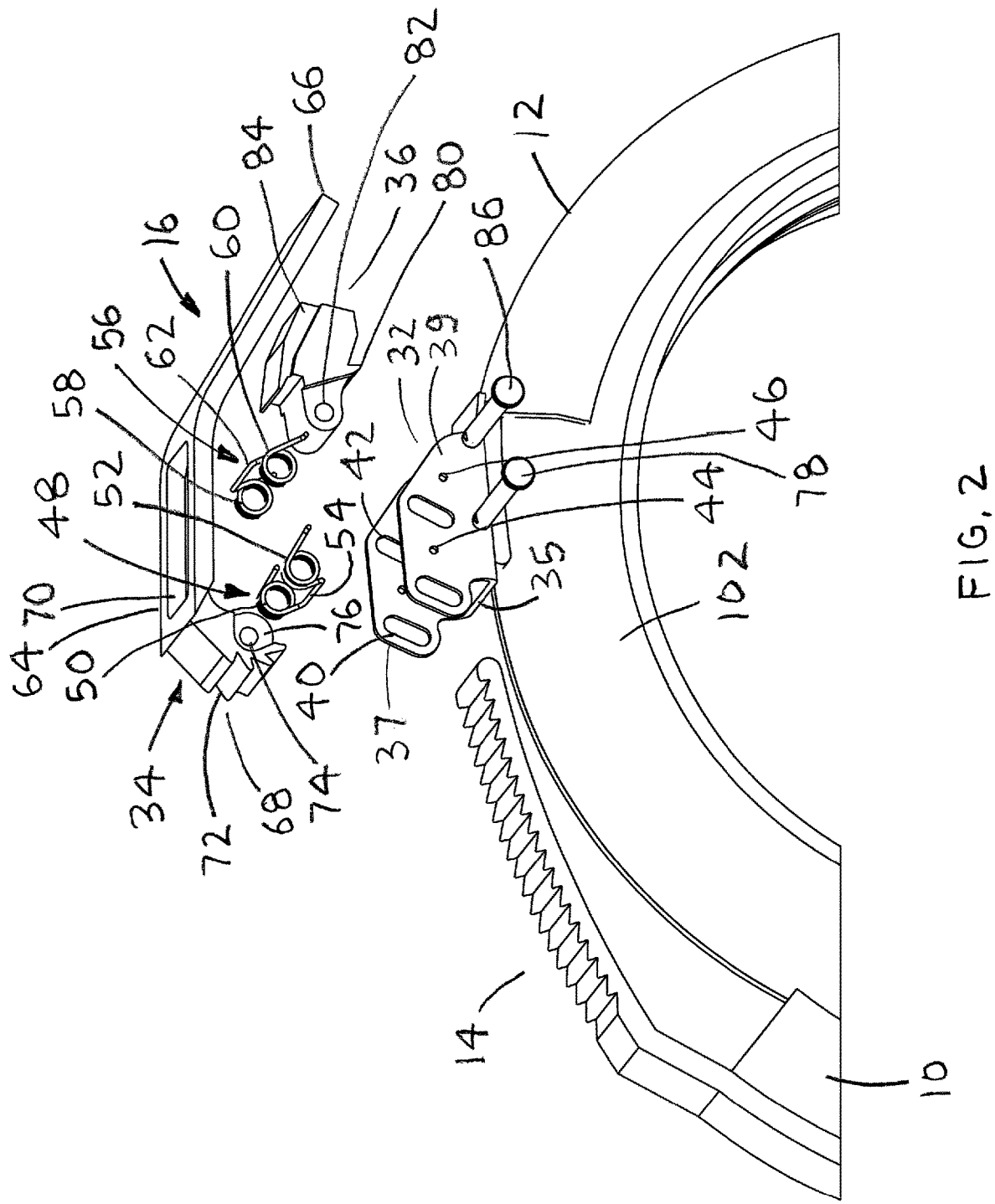
FIG. 2 is a partially exploded perspective view of a portion of a ratchet clamp in accordance with the present invention.

With reference now to the drawings, and particularly to FIG. 1, there is shown a perspective view of a ratchet clamp 1. With reference to FIG. 2, the ratchet clamp 1 preferably includes a first clamp half 10, a second clamp half 12, a ratchet arm 14 and a locking ratchet device 16. The ratchet arm 14 and the locking ratchet device 16 could be considered a locking device. However, the locking device could also be any other suitable clamp locking mechanism, such as that disclosed in U.S. Pat. No. 4,008,937 or patent publication no. 2011/0101687. U.S. Pat. No. 4,008,937 and patent publication no. 2011/0101687 are herein incorporated by reference in their entirety. The first and second clamp halves 10, 12 include a substantially semi-circular shape and a V-shaped cross section. The second clamp half 12 retains a first flange style pipe connector 100 and a second flange style pipe connector 102. The first and second pipes have not been drawn for the sake of clarity. A pivot flange 20 is formed on one end of the first clamp half 10. The ratchet arm 14 is preferably formed as an integral portion of an opposing end of the first clamp half 10. However, the ratchet arm 14 may be also be secured to the opposing end of the first clamp half 10 with welding, fasteners or any other suitable method. A pivot yoke 24 is formed on one end of the second clamp half 12 to receive the pivot flange 20 of the first clamp half 10. The pivot yoke 24 is pivotally secured to the pivot flange 20 with a pin 18, rivets or any other suitable method. The locking ratchet device 16 is attached to an opposing end of the second clamp half 12 with welding fasteners or any other suitable method.

Figure 3:
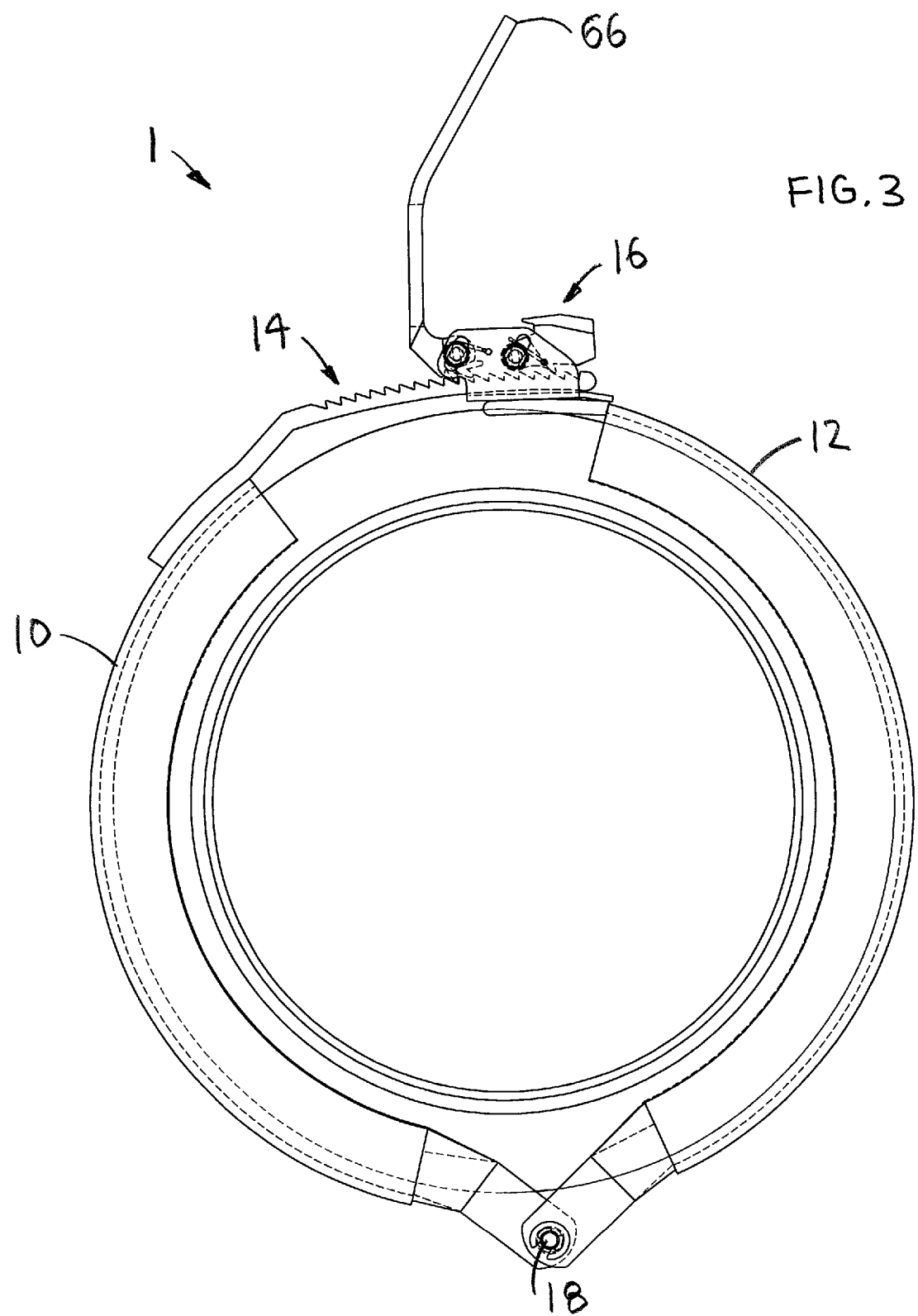
FIG. 3 is a front view of a ratchet clamp in a closed orientation with a drive member of a ratchet lever engaging a ratchet arm in accordance with the present invention.
Figure 4:
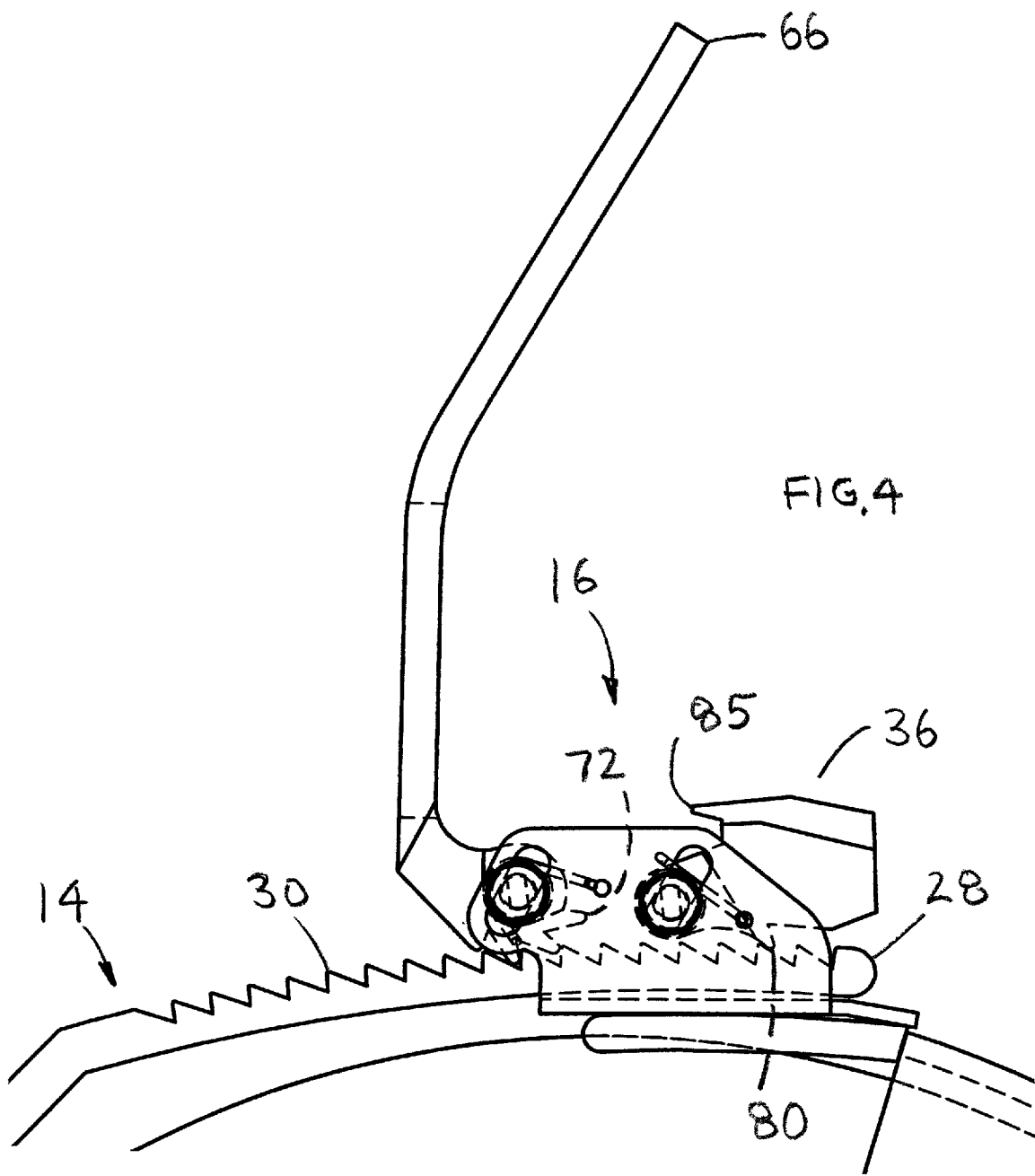
FIG. 4 is an enlarged side view of a ratchet lever of a locking ratchet device engaging a ratchet arm of a ratchet clamp in accordance with the present invention.
Figure 5:
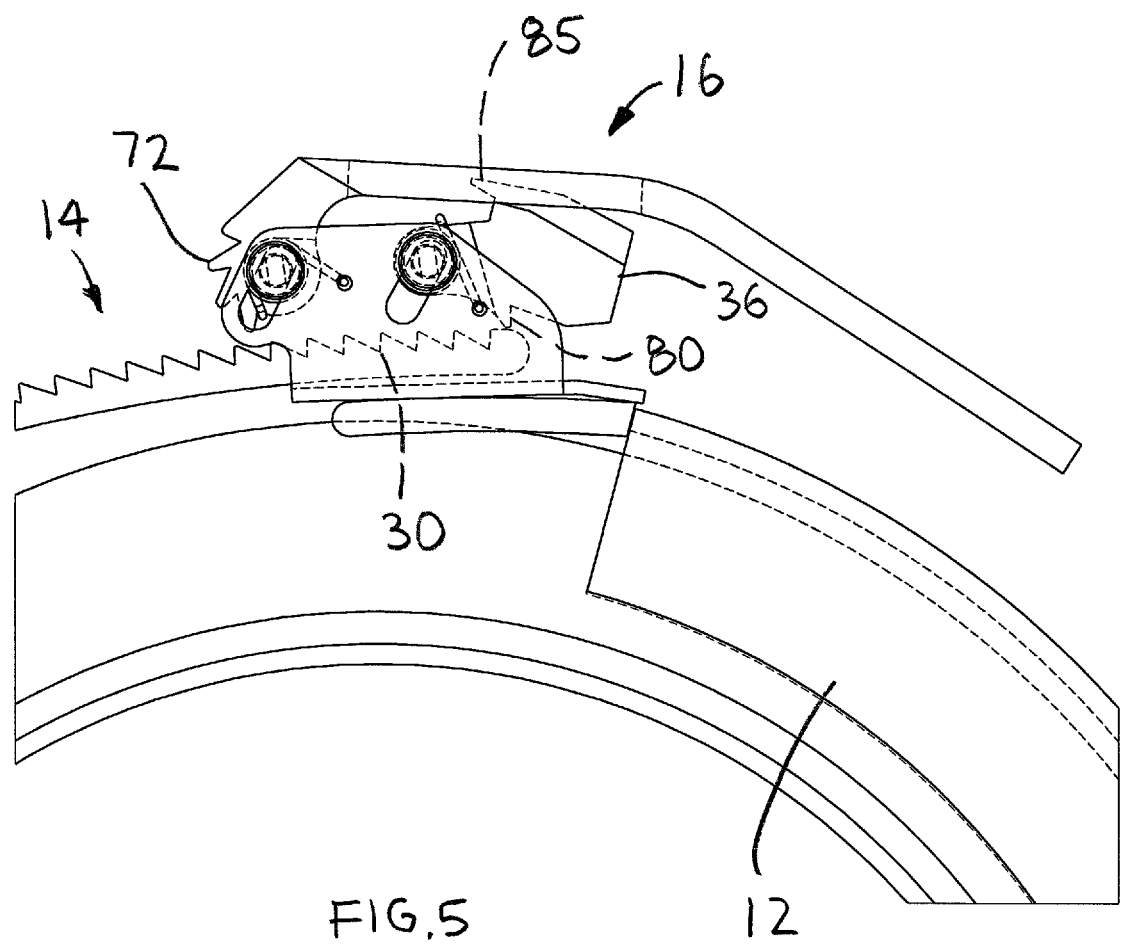
FIG. 5 is an enlarged side view of a locking ratchet device in a closed position of a ratchet clamp in accordance with the present invention.

The ratchet arm 14 includes a base member 26 and a tooth member 28. The tooth member 28 preferably extends from the base member 26 at an obtuse angle "A." However, at least one of the base member 26 and the tooth member 28 could be fabricated from a flexible material. The tooth member 28 includes a plurality of ratchet teeth 30 formed on a top surface thereof. With reference to FIGS. 3-5, the locking ratchet device 16 includes a base bracket 32, a ratchet lever 34 and a lock pawl 36. The base bracket 32 includes a base plate 35, a first side plate 37 and a second side plate 39. The first side plate 37 extends upward from a first end of the base plate 35 and the second side plate 39 extends upward from a second end of the base plate 35. A pair of angled slots 40, 42 are formed through the first and second side plates 36, 38. A first spring anti-rotation hole 44 and a second spring anti-rotation hole 46 are preferably formed through the first and second side plates 37, 39, adjacent each angled slot 40, 42, respectively.

A ratchet lever spring 48 includes a first lever torsion spring 50, a second lever torsion spring 52 and a lever connecting member 54. One end of the first lever torsion spring 50 extends from a first end of the lever connecting member 54 and one end of the second lever torsion spring 52 extends from a second end of the lever connecting member 54. The opposing ends of the first and second torsion springs extend at an obtuse angle relative to the lever connecting member 54. Each opposing end of the first and second lever torsion springs are turned outward to be received by the first spring anti-rotation holes 44.

A pawl lock spring 56 includes a first lock torsion spring 58, a second lock torsion spring 50 and a lock connecting member 62. One end of the first lock torsion spring 58 extends from a first end of the lock connecting member 62 and one end of the second lock torsion spring 60 extends from a second end of the lock connecting member 62. The opposing ends of the first and second lock torsion springs 58, 60 extend in an opposing direction relative to the lock connecting member 62. Each opposing end of the first and second torsion springs 58, 60 are turned outward to be received by the second spring anti-rotation holes 46.

The ratchet lever 34 preferably includes a base member 64, a lever member 66 and a drive member 68. A clearance slot 70 is formed through the base member 64. The lever member 66 extends from one end of the base member 64, preferably at an obtuse angle. The drive member 68 extends from an opposing end of the base member 64. The drive member 68 includes a plurality of ratchet teeth 72 formed on an outer radius thereof. A lever pin hole 74 is formed through the drive member 68 concentric with an axis of the outer radius. A pair of opposing counter bores 76 are formed in opposing sides of the drive member 68, concentric with the axis of the outer radius to receive the first and second lever torsion springs 50, 52. A lever pin 78 is inserted through the angled slots 40 and the lever pin hole 74 to pivotally retain the ratchet lever 34 in the base bracket 32. The ratchet lever spring 48 biases the ratchet lever 34 upward in the angled slot 40. When the ratchet lever 34 is lifted upward from a closed orientation, the plurality of ratchet teeth 72 engage the ratchet teeth 38 in the ratchet arm 14 to move the opposing ends of the first and second clamp halves 10, 12 together.

The lock pawl 36 includes at least one downward facing ratchet tooth 80, a lock pivot hole 82, a top projection 84 and a lift edge 85 (see FIGS. 4-5). The lock pivot hole 82 is formed through an end of the lock pawl 36, parallel to the ratchet tooth 80. A width of the top projection 84 is less than a width of the lock pawl 36. A width of the top projection is sized to be received by the clearance slot 70. A lock pin 86 is inserted through the angled slots 42 and the lock pin hole 82 to pivotally retain the lock pawl 36 in the base bracket 32. The pawl lock spring 56 biases the lock pawl 36 downward, such that the ratchet tooth 60 engages one of the plurality of teeth 30 in the ratchet arm 14.

Figure 7:
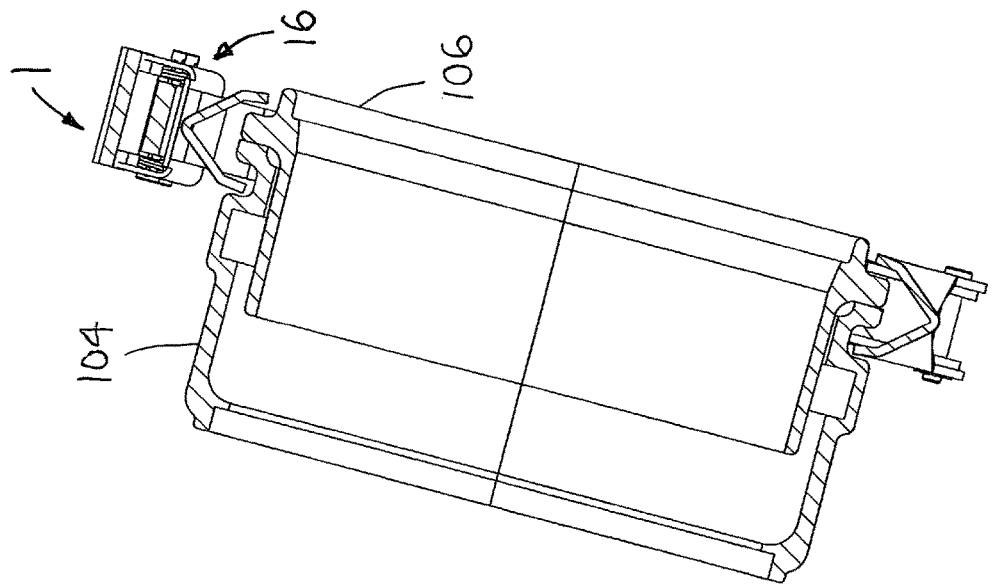
FIG. 7 is a cross sectional view cut through a ratchet clamp of FIG. 6 in accordance with the present invention.
Figure 6:
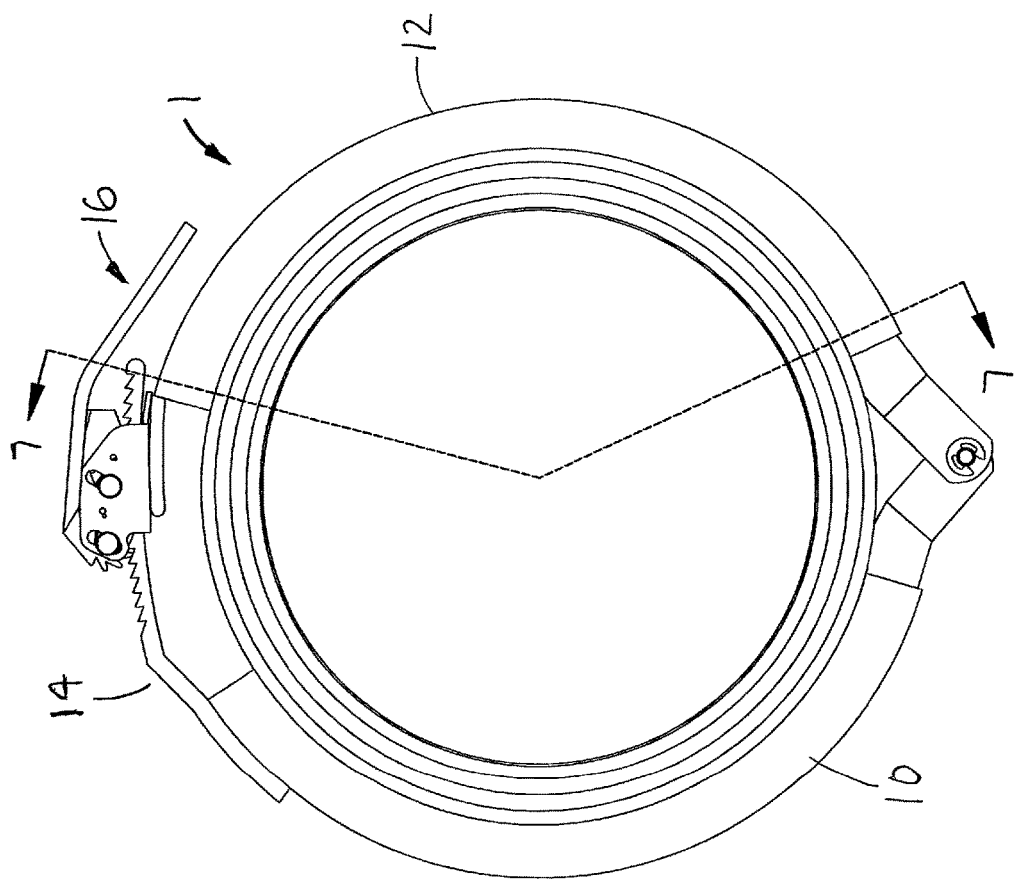
FIG. 6 is a front view of a ratchet clamp in a closed orientation retaining two lock ring style pipe connectors in accordance with the present invention.

With reference to FIGS. 6-7, the ratchet clamp 1 in a closed orientation is shown retaining a first lock ring style pipe connector 104 and a second lock ring style pipe connector 106 with the first and second clamp halves 10, 12.

In use, two pipes (not shown) with flange style connectors 100, 102 are attached adjacent to each other by placing the first and second clamp halves 10, 12 over the two flange style pipe connectors 100, 102. The ratchet arm 14 is lifted upward to draw the opposing ends of the first and second clamp halves toward each other. The ratchet clamp 1 is removed from the two pipes by lifting a lift edge 85 of the lock pawl 36 away from the two pipes.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A ratchet clamp with an automatic fail safe comprising:
a first clamp half having one end and an opposing end, said first clamp half having a substantially semi-circular shape;
a second clamp half having one end and an opposing end, said second clamp half having a substantially semi-circular shape, said one end of said first clamp half is pivotally attached to said one end of said second clamp half;
a ratchet arm includes a plurality of teeth, said ratchet arm extends from said opposing end of said first clamp half; and
a locking ratchet device includes a ratchet lever and a lock pawl, said locking ratchet device is slidably retained relative to said opposing end of said second clamp half, said lock pawl is slidably retained relative to said opposing end of said second clamp half, wherein said ratchet arm is inserted into said locking ratchet device, said ratchet lever is actuated to engage said ratchet arm, said lock pawl engages at least one of said plurality of teeth of said ratchet arm.

2. The ratchet clamp with an automatic fail safe of claim 1 wherein:
said ratchet arm includes a base member and a tooth member, said tooth member extends from said base member, a plurality of ratchet teeth are formed in said tooth member.

3. The ratchet clamp with an automatic fail safe of claim 1 wherein:
said locking ratchet device includes a base bracket, said ratchet lever and said lock pawl, said base bracket is retained on said opposing end of said second clamp half, one end of said ratchet lever is pivotally retained in said base bracket, said lock pawl is pivotally retained in said base bracket.

4. The ratchet clamp with an automatic fail safe of claim 1, further comprising:
said lock pawl includes at least one downward facing ratchet tooth, said ratchet tooth is capable of engaging at least one of said plurality of teeth in said ratchet arm, a pawl lock spring biases said at least one ratchet tooth downward.

5. The ratchet clamp with an automatic fail safe of claim 1, further comprising:
said ratchet lever includes a drive member, said drive member is located on one end of said ratchet lever, said drive member includes a plurality of ratchet teeth formed on an outer radius thereof, said plurality of ratchet teeth of said ratchet lever are sized to engage said plurality of teeth of said ratchet arm.

6. The ratchet clamp with an automatic fail safe of claim 1 wherein:
a pivot flange is formed on said one end of said first clamp half, a pivot yoke is formed on one end of said second clamp half, said pivot yoke is sized to receive said pivot flange.

7. The ratchet clamp with an automatic fail safe of claim 1 wherein:
a cross section of said first and second halves are sized to retain either flange style pipe connectors or lock ring style pipe connectors.

8. A ratchet clamp with an automatic fail safe comprising:
a first clamp half having one end and an opposing end, said first clamp half having a substantially semi-circular shape and a V-shaped cross section;
a second clamp half having one end and an opposing end, said second clamp half having a substantially semi-circular shape and a V-shaped cross section, said one end of said first clamp half is pivotally attached to said one end of said second clamp half;
a ratchet arm includes a plurality of teeth, said ratchet arm extends from said opposing end of said first clamp half; and
a locking ratchet device includes a ratchet lever and a lock pawl, said locking ratchet device is slidably retained relative to said opposing end of said second clamp half, said lock pawl is slidably retained relative to said opposing end of said second clamp half, wherein said ratchet arm is inserted into said locking ratchet device, said ratchet lever is actuated to engage said ratchet arm, said lock pawl engages at least one of said plurality of teeth of said ratchet arm.

9. The ratchet clamp with an automatic fail safe of claim 8 wherein:
said ratchet arm includes a base member and a tooth member, said tooth member extends from said base member, a plurality of ratchet teeth are formed in said tooth member.

10. The ratchet clamp with an automatic fail safe of claim 8 wherein:
said locking ratchet device includes a base bracket, said ratchet lever and said lock pawl, said base bracket is retained on said opposing end of said second clamp half, one end of said ratchet lever is pivotally retained in said base bracket, said lock pawl is pivotally retained in said base bracket.

11. The ratchet clamp with an automatic fail safe of claim 8, further comprising:
said lock pawl includes at least one downward facing ratchet tooth, said ratchet tooth is capable of engaging at least one of said plurality of teeth in said ratchet arm, a pawl lock spring biases said at least one ratchet tooth downward.

12. The ratchet clamp with an automatic fail safe of claim 8, further comprising:
said ratchet lever includes a drive member, said drive member is located on one end of said ratchet lever, said drive member includes a plurality of ratchet teeth formed on an outer radius thereof, said plurality of ratchet teeth of said ratchet lever are sized to engage said plurality of teeth of said ratchet arm.

13. The ratchet clamp with an automatic fail safe of claim 8 wherein:
a pivot flange is formed on said one end of said first clamp half, a pivot yoke is formed on one end of said second clamp half, said pivot yoke is sized to receive said pivot flange.

14. A pipe clamp comprising:
a first clamp half having one end and an opposing end, said first clamp half having a substantially semi-circular shape;
a ratchet arm includes a plurality of teeth, said ratchet arm extends from said opposing end of said first clamp half;
a second clamp half having one end and an opposing end, said second clamp half having a substantially semi-circular shape, said one end of said first clamp half is pivotally attached to said one end of said second clamp half, said first and second clamp halves having a cross section which is sized to retain either flange style pipe connectors or lock ring style pipe connectors; and
a locking ratchet device includes a ratchet lever and a lock pawl, said locking ratchet device is slidably retained relative to said opposing end of said second clamp half, said lock pawl is slidably retained relative to said opposing end of said second clamp half, wherein a ratchet arm is inserted into said locking ratchet device, said ratchet lever is actuated to engage said ratchet arm, said lock pawl engages at least one of said plurality of teeth of said ratchet arm, said locking ratchet device maintaining said opposing ends of said first and second clamp halves around either the flange style pipe connectors or the lock ring style pipe connectors in a locked orientation.

15. The pipe clamp of claim 14 wherein:

said ratchet arm includes a base member and a tooth member, said tooth member extends from said base member, a plurality of ratchet teeth are formed in said tooth member.

16. The pipe clamp of claim 14 wherein:

said locking ratchet device includes a base bracket, said ratchet lever and said lock pawl, said base bracket is retained on said opposing end of said second clamp half, one end of said ratchet lever is pivotally retained in said base bracket, said lock pawl is pivotally retained in said base bracket.

17. The pipe clamp of claim 14, further comprising:

said lock pawl includes at least one downward facing ratchet tooth, said ratchet tooth is capable of engaging at least one of said plurality of teeth in said ratchet arm, a pawl lock spring biases said at least one ratchet tooth downward.

18. The pipe clamp of claim 14, further comprising:

said ratchet lever includes a drive member, said drive member is located on one end of said ratchet lever, said drive member includes a plurality of ratchet teeth formed on an outer radius thereof, said plurality of ratchet teeth of said ratchet lever are sized to engage said plurality of teeth of said ratchet arm.

19. The pipe clamp of claim 14 wherein:

a pivot flange is formed on said one end of said first clamp half, a pivot yoke is formed on one end of said second clamp half, said pivot yoke is sized to receive said pivot flange.

\* \* \* \* \*